(12) United States Patent
Steinmann et al.

(10) Patent No.: US 11,619,712 B2
(45) Date of Patent: Apr. 4, 2023

(54) HYBRID LIDAR-IMAGING DEVICE FOR AERIAL SURVEYING

(71) Applicant: LEICA GEOSYSTEMS AG, Heerbrugg (CH)

(72) Inventors: Patrick Steinmann, Oberuzwill (CH); Werner Kirchhofer, Walzenhausen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 975 days.

(21) Appl. No.: 16/138,661

(22) Filed: Sep. 21, 2018

(65) Prior Publication Data
US 2019/0094344 A1 Mar. 28, 2019

(30) Foreign Application Priority Data
Sep. 22, 2017 (EP) .................................... 17192755

(51) Int. Cl.
| | |
|---|---|
| *G01S 7/481* | (2006.01) |
| *G01S 17/89* | (2020.01) |
| *G01S 17/42* | (2006.01) |
| *G01C 11/02* | (2006.01) |
| *G01S 17/86* | (2020.01) |

(Continued)

(52) U.S. Cl.
CPC ............ *G01S 7/4817* (2013.01); *B64D 47/08* (2013.01); *G01C 11/02* (2013.01); *G01C 15/002* (2013.01); *G01S 7/4808* (2013.01); *G01S 7/4863* (2013.01); *G01S 17/42* (2013.01); *G01S 17/86* (2020.01); *G01S 17/89* (2013.01); *G06V 20/188* (2022.01)

(58) Field of Classification Search
None
See application file for complete search history.

(56) References Cited

U.S. PATENT DOCUMENTS

| | | |
|---|---|---|
| 5,812,629 A | 9/1998 | Clauser |
| 7,298,869 B1 | 11/2007 | Abernathy |

(Continued)

FOREIGN PATENT DOCUMENTS

| | | |
|---|---|---|
| CN | 103017739 A | 4/2013 |
| CN | 106796276 A | 5/2017 |

(Continued)

OTHER PUBLICATIONS

Teledyne DALSA, "Multi-line CMOS Color TDI Camera Delivers Breakthrough Performance", 2017, Teledyne DALSA, Revision No. 03-070-20097-02, pp. 1-2 (Year: 2017).*

(Continued)

*Primary Examiner* — Yuqing Xiao
*Assistant Examiner* — Benjamin Richard Hebert
(74) *Attorney, Agent, or Firm* — Maschoff Brennan (57) ABSTRACT

A hybrid LiDAR-imaging device is configured for aerial surveying and comprises a camera arrangement adapted for generating orthophoto data and a LiDAR device, in which an overall exposure area is provided by the camera arrangement, which has a transverse extension of at least 60 mm and the LiDAR device has a longitudinal extension axially along a ground viewing nominal LiDAR axis and a lateral extension substantially orthogonal to the nominal LiDAR axis, in which the longitudinal extension is larger than the lateral extension.

16 Claims, 7 Drawing Sheets

(51) Int. Cl.
*B64D 47/08* (2006.01)
*G01C 15/00* (2006.01)
*G01S 7/48* (2006.01)
*G01S 7/4863* (2020.01)
*G06V 20/10* (2022.01)

(56) References Cited

U.S. PATENT DOCUMENTS

| | | | |
|---|---|---|---|
| 7,363,157 | B1 | 4/2008 | Hanna et al. |
| 10,324,183 | B2 * | 6/2019 | Ohtomo .................. G01S 17/66 |
| 2002/0060784 | A1 | 5/2002 | Pack et al. |
| 2004/0130702 | A1 | 7/2004 | Jupp et al. |
| 2007/0046448 | A1 | 3/2007 | Smitherman |
| 2008/0103699 | A1 * | 5/2008 | Hanna ..................... G01S 17/89 702/53 |
| 2009/0154793 | A1 | 6/2009 | Shin et al. |
| 2011/0164037 | A1 | 7/2011 | Yoshida et al. |
| 2011/0216304 | A1 | 9/2011 | Hall |
| 2014/0247953 | A1 | 9/2014 | Schmidt et al. |
| 2017/0234973 | A1 | 8/2017 | Axelsson |
| 2017/0244880 | A1 | 8/2017 | Cope et al. |

FOREIGN PATENT DOCUMENTS

| | | | |
|---|---|---|---|
| CN | 107085218 A | 8/2017 | |
| EP | 3 179 209 A1 | 6/2017 | |
| WO | 2007/094765 A2 | 8/2007 | |
| WO | WO-2014031284 A1 * | 2/2014 | ............. G01C 11/02 |
| WO | WO-2017189185 A1 * | 11/2017 | ........... G01S 7/4817 |

OTHER PUBLICATIONS

Extended European Search Report dated Apr. 9, 2018 as received in Application No. 17192755.1.

Frank, M., et al., "Vegetation management of utility corridors using high-resolution hyperspectral imaging and LiDAR," 2010 2nd Workshop on Hyperspectral Image and Signal Processing: Evolution in Remote Sensing, pp. 1-4 (Jun. 14, 2010).

Yabing Fan et al; Research on quick implement for the Digital Orthophoto Map based on LiDAR data and digital camera; Surveying and Mapping Engineering; vol. 22; Issue 06, Dec. 2013.

Qi Hu et al; The method of making Digital Orthophoto Map with Airborne LiDAR and optical image; Geospatial Information; vol. 9; Issue 3, Jun. 2011.

* cited by examiner

HYBRID LIDAR-IMAGING DEVICE FOR AERIAL SURVEYING

FIELD

The present disclosure relates to a hybrid LiDAR-imaging device configured for aerial surveying according to claim 1.

BACKGROUND

Airborne surveying, e.g., satellite-based surveying and aerial based surveying by means of dedicated surveying devices carried by aeroplanes, helicopters, UAVs, or balloons, can provide information on many things not visible from the ground, wherein aerial surveying typically has better resolution, quality, and atmospheric conditions as satellite imagery technologies.

Aerial photography is used in a large number of different application domains, e.g. cartography, particularly in photogrammetric surveys, land surveying, navigation systems, urban planning and architecture, archaeology, geodesign, emergency management, gaming or augmented reality applications, intelligent transportation systems, property management, monitoring vegetation and ground cover, and so forth. Vertical photographs are often used to create orthophotos, alternatively known as orthophotomaps. An orthophoto is an aerial photograph or image geometrically corrected ("orthorectified") such that the scale is uniform, e.g., the photo has the same lack of distortion as a map. Thus, by way of example, unlike an uncorrected aerial photograph, an orthophotograph may be used to measure true distances because it is an accurate representation of the Earth's surface, e.g. having been adjusted for topographic relief, lens distortion, and camera tilt. In other words, orthophotos are photographs or images which have been geometrically "corrected" so as to represent a photograph or image taken from an infinite distance, looking straight down to nadir. In particular, perspective is removed and variations in terrain are taken into account, wherein typically multiple geometric transformations are applied to the image, depending on the perspective and terrain corrections that may be required on a particular part of the image.

By way of example, orthophotos are commonly used in geographic information systems (GIS) as a "map accurate" background image, e.g. to create maps wherein the images are aligned, or "registered", with known real-world coordinates.

An orthorectified image differs from "rubber sheeted" rectifications as the latter may accurately locate a number of points on an image (e.g., multiple images, each image, etc.) but "stretch" the area in between such that the scale may not be uniform across the image.

Typically, a digital elevation model (DEM) is used as projection basis to create an accurate orthophoto, wherein distortions in the image due to the varying distance between the camera/sensor and different points on the ground are corrected.

Overlays of orthophotos and/or satellite imagery onto a digital elevation model may further be used to simulate 3D landscapes. Typically, such digital 3D surface models are generated at various levels of detail (LOD) and abstraction, and at multiple resolutions. High-resolution textured and GIS-ready (GIS: Geographic Information Systems) 3D models are usually generated from stereo images and/or perspective views. In a first step, based on image based point matching, point clouds are generated using semi global matching algorithms (SGM) or similar techniques. Specialized software is used, to extract 3D models out of these point clouds, e.g. based on additional input such as building footprints or data from multi-spectral cameras. For example, the Leica ADS100 with multi-spectral capability allows the generation of normalized difference vegetation index images (NDVI images) to reduce (e.g., in some cases eliminate) vegetation and thus to improve the recognition rate of objects within the point cloud, e.g. by geometric or semantic classification.

3D representation of landscapes and urban areas may also be achieved by creating meshes from point clouds, the point clouds being generated by LiDAR scanning and/or through the extraction from stereo images using SGM or similar techniques.

Point clouds generated from imaging, even for very dense overlaps (dense matching), typically show problem areas where efficient point extraction is not good enough. For example, this is the case for occlusions and canyons with low lighting conditions, for shadow areas exhibiting increased noise, for very inhomogeneous areas such as vegetation, and for very homogeneous surfaces such as water. This reduces accuracy and, for example, may cause wrong automatic feature extraction and/or wrong automatic feature modelling. In particular, problems such as meltdown on edges, color fringes, and/or wrong ground height modelling may occur.

Point clouds from LiDAR data generally do not have such issues because LiDAR scanning is less dependent on lighting or shadowing effects.

However point clouds generated from LiDAR data typically have lower point density and meshes have far less detail, which is why for high-resolution modelling it is common practice that meshes are more likely based on nadir and/or oblique imaging as image data offers better resolution and thus more detail.

However, one advantage of LiDAR scanning in comparison with photogrammetry is the ability to filter out reflections from vegetation from the point cloud model to create a digital surface model of concealed ground surfaces, e.g. concealed by trees. Thus, LiDAR data are typically used to generate a reference model, particularly a digital elevation model and/or a digital surface model, to support and improve 3D modelling accuracy based on stereo-imaging.

Furthermore, LiDAR based workflows are comparatively much more efficient than generating point clouds using computationally intensive SGM or similar techniques. Therefore, a combination of LiDAR and imaging based point cloud generation may be used to generate a tradeoff between efficiency and certain quality criteria.

For example, LiDAR data may be consulted for specific areas, e.g. where lighting conditions for classical imaging are not favourable and thus have low signal to noise (SN), regions with occlusions, regions with specific surface texture such as very homogeneous regions (e.g. water), and regions with vegetation. On the other hand, to increase the workflow efficiency it may be favourable to replace as much of the imaging data by LiDAR data, such that point cloud generation is mainly based on LiDAR.

Imaging devices for orthophotography and LiDAR devices usually have quite different system requirements, e.g. in terms of optomechanical design and packaging as well as data processing. Thus, imaging data and LiDAR data are typically acquired by separate surveying processes using specialized imaging and LiDAR devices, wherein data and/or models based on imaging and LiDAR data comprise positional reference information, e.g. based on GNSS receivers and IMU systems configured to link the data and/or models with the world geodetic system. The data and/or models are then combined later on, e.g. wherein georeferenced data and/or models are stored on a central database.

However, terrain properties may change over time, e.g. depending on natural and/or man-made processes, and thus separately acquired imaging data and LiDAR data may not be compatible any more for combination and additional surveying flights to update the database with respect to one or both the imaging and the LiDAR data may be required. At worst, a change in terrain between the time of acquisition of imaging and LiDAR data goes unnoticed and, for example, an outdated digital elevation model is used to support orthophoto generation.

SUMMARY

An example aspect of the present disclosure is to provide an improved aerial surveying device for generating data adapted for orthophoto production which overcomes the above mentioned limitations.

This example aspect may be achieved by realizing the features of the independent claim. Features which further develop the disclosure in an alternative or advantageous manner are described in the dependent patent claims.

The disclosure relates to a hybrid LiDAR-imaging device configured for aerial surveying of an overflown terrain comprising a, particularly nadir viewing, camera arrangement configured for acquiring camera data which are adapted for generating orthophoto data.

An overall exposure area is provided by the camera arrangement, the overall exposure area having a transverse extension defined as the extension along a direction which is foreseen to be the direction across a forward flying direction when the hybrid LiDAR-imaging device is installed to an aerial device, in the following called transverse direction, and the transverse extension is at least 60 mm.

According to the disclosure the hybrid LiDAR-imaging device further comprises a LiDAR arrangement configured for generating LiDAR data, the LiDAR arrangement comprising at least a first LiDAR device, wherein the first LiDAR device has a first longitudinal extension being defined as the extension axially along a ground viewing nominal first LiDAR axis and a first lateral extension being defined as an extension substantially orthogonal to the nominal first LiDAR axis, wherein the first longitudinal extension is larger than the first lateral extension.

The LiDAR arrangement is configured to have a LiDAR scanning field of view along the transverse direction which substantially covers an imaging field of view of the camera arrangement along the transverse direction.

The camera arrangement and the LiDAR arrangement are mounted into a common housing, the common housing being specifically foreseen to be installed to the aerial device, wherein the hybrid LiDAR-imaging device is configured to generate the camera data and the LiDAR data in one go, e.g., during the same measuring process but not necessarily exactly time synchronous, and to generate, based on positioning information of a positioning system, positional reference information for as well the camera data as the LiDAR data.

Thus, according to the disclosure, by quickly (e.g., instantaneously or near-instantaneously) combining the best of the two worlds of imaging and LiDAR scanning—high resolution information by ortho-photographic imaging or stereoscopic imaging and lighting independent information by LiDAR scanning—independent of terrain and surface evolution, the generation of data for 3D modelling is improved, in particular regarding efficiency and accuracy of object extraction, while at the same time a compact packaging of the camera arrangement and the LiDAR arrangement into the same housing is enabled.

The camera arrangement may be based on CCD and/or CMOS sensor technology and, for example, be specifically engineered for aerial surveying, e.g. to provide a large swath by a single camera. Typically, such cameras have forward motion compensation, e.g. based on TDI technology (TDI: Time Delay and Integration) and/or an embedded flight management and GNSS/IMU system to provide high image quality and high geometric and radiometric accuracy. For example, the camera arrangement and/or the LiDAR arrangement and/or the hybrid LiDAR-imaging device as a whole may be stabilized in terms of stable nadir view, e.g. by compensating for any aircraft movement during active exposure times. For example, automatic drift control and pitch, roll compensation may be provided by IMU data.

Such cameras may further be configured for generating multispectral imaging data, particularly RGBN stereo-imaging data, and/or hyperspectral imaging data. By way of example, multispectral and/or hyperspectral image information as NDVI images may be used for semantic discrimination of objects with specific wavelength and polarization dependent reflection properties, such as for example typical reflection signals for vegetation and water.

By way of example, the camera arrangement comprises a line sensor having at least one, particularly nadir viewing, effective sensor line.

An effective sensor line corresponds to exactly one projected ("push-broom") scan line on the ground and may comprise pixel rows having different spectral sensitivity and/or pixel rows configured for providing forward motion compensation, e.g. different TDI stages. However, the overall number of pixel rows forming an effective sensor line, e.g. less than 200, is much smaller than the overall number of pixel columns, e.g. more than 10,000.

According to one embodiment, the camera arrangement comprises a line camera arrangement having at least two effective sensor lines arranged with mutually different viewing directions with respect to the pitch axis, in particular at most five effective sensor lines, more particularly exactly two or three effective sensor lines.

By way of example, the LiDAR arrangement may be configured that a scanning pattern—e.g. defined by at least one of a projected beam pattern on the ground, a beam shape, a scanning rate, a pulse repetition rate, and the radiation power—is adjusted based on a forward flying speed and an actual ground distance of the aerial device, e.g. to provide a uniform point spacing. In particular, the LiDAR arrangement is adapted for a circular (e.g. Palmer) LiDAR scan. Alternatively, the LiDAR arrangement may be adapted to provide a rather simple (linear) "zig-zag" scan pattern, e.g. by using a sweeping deflection mirror or more elaborated alternative circular scan movements (Palmer scan pattern, Lissajous scan pattern). For example, the latter may have the advantage that with one flyover, each measured surface point can be detected from two different viewing angles. This minimizes shadow effects, wherein a large area can be scanned at the same time with low energy laser pulses.

By way of example, the LiDAR arrangement may comprise a deflection element suitable for the controlled angular deflection of optical radiation, such as a rotatable prism, a moving optical fiber, a moving mirror, a refractive optical element, a deformable optical component, etc. The measurement usually takes place with the determination of distance and angles, that is to say in spherical coordinates, which can also be transformed into Cartesian coordinates for display and further processing.

The LiDAR arrangement may be configured to be operated in one of two modes. In a linear mode a high energy pulse is transmitted, resulting in a pulse return signal that is high enough for treatment as an analog signal, wherein the signal amplitude is proportional to the target reflectivity. In the so-called Single (low count) Photon LiDAR mode, in the following called SPL mode, a low energy pulse is used, resulting in a low return pulse signal, wherein each package of returning photons is treated as an event and normally no amplitude information is available.

For linear mode operation the pulse is often captured with high speed analog-to-digital (ADC) conversion and then analysed to give very good accuracy (<1 cm) range measurements. Since analog signals contain amplitude and slewrate information, range bias effects due to nonlinearities and signal processing effects can be characterized and corrected for and thus high accuracies for a wide range of returning pulse strengths are achieved.

For Single Photon LiDAR mode normally no amplitude or slewrate information is available and bias, nonlinearity, and noise effects cannot easily be corrected for. To mitigate the lack of this information, often short pulses (<1 ns) are used to accurately determine the ranges. This however does not solve any problems due to nonlinear timing behaviour in the detector.

For example, a single photon avalanche detector (SPAD) or a Geiger mode avalanche photodiode (gmAPD) may be used which can convert a received photon package to one event. However, the generated signal is not proportional to the number of photons in the package.

Alternatively, the LiDAR device may be based on photomultiplier tubes (PMT), silicon photomultipliers (SiPM), microchannel plate detectors (MCP), or hybrid detectors such as intensified photodetectors (IPD) to convert a photon package to electrical signal, wherein the signal is proportional to the number of photons detected in the package, i.e. from a signal point of view these kind of detectors provide more information than SPAD or gmAPD detectors.

By way of example, modern SPAD-array based detectors may be used. SPAD-arrays are typically arranged as matrix structure on a chip and have high photosensitivities in the ultraviolet, visual, and near infrared spectral range. For example, SiPM have high sensitivity in the visual wavelength range, wherein sensors based on the semiconducting material InGaAs have high sensitivity up to the near infrared range.

SPAD-arrays, which are manufactured by means of a conventional CMOS technology process, have advantages, for example, in the integration of electronic components and circuits. Furthermore, SPADs have a low break voltage, which simplifies the control. In particular, SPAD-arrays may have hundreds or thousands of microcells, wherein microcells are connected in parallel to one or multiple signal outputs such that thousands or hundred thousands of photons can be received at the same time. A SPAD-array may be configured that it behaves like an analog photosensor, whereby for weak signals, the characteristic curve is approximately proportional to the intensity of the incident laser signals. Furthermore, a SPAD-array based LiDAR detector has great dynamic range and compresses the received beam intensity from very small to very large signals. Thus, a SPAD-array based detector actually does not saturate and nonlinear timing behaviour in the detector is inherently minimized.

In one embodiment, the camera arrangement comprises at least one individual camera with a photodetector which has a transverse extension which is at least 60 mm, particularly at least 100 mm. Having such an individual large sensor camera may for example have advantages in terms of opto-mechanical design, long-term stability, or data referencing.

According to another embodiment, the camera arrangement comprises at least two individual cameras, wherein each camera is used to provide a different part of the transverse extension of the overall exposure area. Therefore, individual cameras having smaller detectors may be used. This may have advantages in terms of packaging or in terms of hardware costs.

For example, according to an embodiment based on one or multiple individual cameras, the hybrid LiDAR-imaging device may be configured that the camera arrangement has a field of view of at least 20 degrees, particularly at least 45 degrees, along the transverse direction.

In particular, according to another embodiment, the transverse extension of the overall exposure area comprises an arrangement of a multitude of photopixels—of one individual or of a multitude of individual camera detectors—representing a sensor line substantially along the transverse direction which comprises at least 10,000 photopixels, i.e. the sensor line being generated based on a single individual camera or a combination of various individual cameras.

In a further embodiment, the first LiDAR device is configured to generate a LiDAR beam and comprises a wedge prism arrangement configured to direct the LiDAR beam to the ground according to a defined scan pattern, based on a rotation of at least one wedge prism of the wedge prism arrangement around the first nominal LiDAR axis, particularly wherein the first wedge prism is part of a Risley prism.

The use of rotating wedge prisms in transmission, e.g. instead of using oscillating or rotating mirrors, particularly allows that the LiDAR device is built substantially vertically and thus provides a compact optomechanical setup and packaging with respect to the horizontal plane, e.g., providing a close together arrangement of the exit optics of the LiDAR arrangement and of the camera arrangement, and thus providing an overall compact hybrid LiDAR-imaging device having a small extension in the horizontal plane. Therefore, when installing the hybrid LiDAR-imaging device in an airplane, an optimized and rather small opening at the bottom of an airplane is sometimes required to fit a gyro stabilized mount, which, for example, may be beneficial in terms of pressure isolation of the airplane when flying at high altitudes or at high speed.

In particular, according to a further embodiment, the first LiDAR device is configured that the ratio of the first lateral extension divided by the first longitudinal extension is less than 0.5.

In another embodiment, the LiDAR arrangement comprises a second LiDAR device, which has a second longitudinal extension being defined as the extension axially along a ground viewing nominal second LiDAR axis and a second lateral extension being defined as an extension substantially orthogonal to the nominal second LiDAR axis, wherein the second longitudinal extension is larger than the second lateral extension, and the LiDAR arrangement is configured that the first and the second LiDAR device are arranged relative to each other such that the first and the second nominal LiDAR axis are tilted with respect to each other, e.g. providing a reduction of blind spots and improved scanning of vertical surfaces.

By way of example, the first LiDAR device has a first visual field cone and the second LiDAR device has a second visual field cone, and the first and the second LiDAR device are configured that the first and the second visual field cone cross each other.

Multiple LiDAR devices may be beneficial in terms of generating dense point clouds, an increased scan frequency, e.g. for optimizing field of view, a slower activation speed of a deflection element, e.g. a slower rotation speed of a rotating beam deflection mirror, and/or an increased pulse repetition rate, e.g. for providing improved ground resolution. Scanning with multiple LiDAR beams of multiple LiDAR devices may involve synchronization of the multiple beams in terms of their individual scanning patterns and/or some sort of beam and/or pulse coding to reduce crosstalk effects between individual beams, e.g., wherein a detector of a first LiDAR device detects light of a second LiDAR device. Furthermore, the multiple LiDAR devices have to be synchronized to reduce point density effects, e.g. in-out-of-phase effects.

To reduce optical cross talk, each LiDAR transmitter may use a separate wavelength, or, to limit the amount of different components, two or more wavelengths may be used in such a manner as the wavelength alternates such that at least adjacent laser beams have a different wavelength. Alternatively or in addition, wavelength selection may also be implemented on receiver side. Anyway, any other techniques for reducing optical cross talk may be applied, e.g. based on polarized light or pulse coding.

According to a further embodiment, the hybrid LiDAR-imaging device comprises an inertial measuring unit (IMU) and a computing unit configured for controlling the camera arrangement and the LiDAR arrangement, and particularly configured for data processing and/or data storage. The common housing has an upper part and a lower part, the lower part being the part which is closer to the ground when the hybrid LiDAR-imaging device is installed in the aerial device, wherein the camera arrangement, the LiDAR arrangement, and the IMU are installed in the lower part such that the lower part comprises substantially all the optics of the camera arrangement and of the LiDAR arrangement as well as the IMU sensors, and the upper part comprises substantially all the processing hardware of the computing unit.

In particular, in a further embodiment, the camera arrangement comprises exactly one individual camera with a photodetector which has a transverse extension which is at least 60 mm, and the LiDAR arrangement comprises exactly two LiDAR devices, namely the above mentioned first and second LiDAR device, wherein the first and the second LiDAR device are arranged relative to each other such that the first and the second nominal LiDAR axis are tilted with respect to each other. Furthermore, the first LiDAR device and the second LiDAR device are arranged next to each and substantially located on a first line parallel to the transverse direction, and the exactly one individual camera is arranged on a second line substantially orthogonal to the first line, such that the exactly one camera, the first LiDAR device, and the second LiDAR device are arranged in a triangular configuration.

BRIEF DESCRIPTION OF DRAWINGS

The hybrid LiDAR-imaging device according to the disclosure is described or explained in more detail below, purely by way of example, with reference to working examples shown schematically in the drawing. Specifically, FIG. 1a,b: aerial surveying using a line camera (a) and a frame camera (b);

FIG. 6a,b: schematic illustration of a further embodiment of a line camera arrangement comprising three effective sensor lines separated along the flying direction.

DESCRIPTION OF EXAMPLE EMBODIMENTS

Figure 1A:
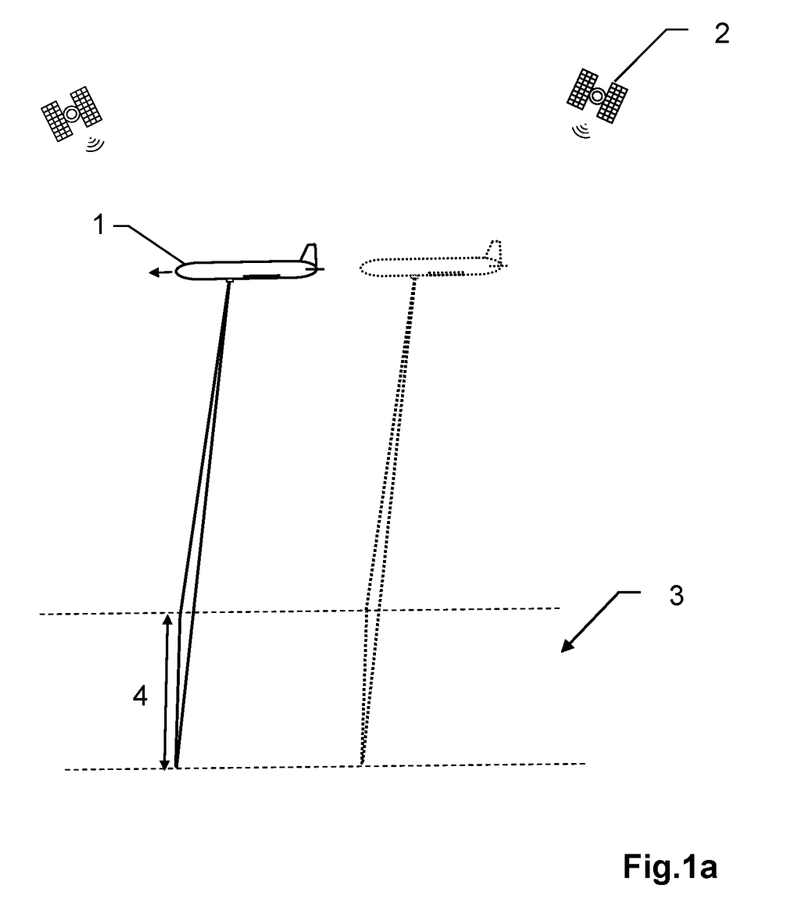
Figure 1B:
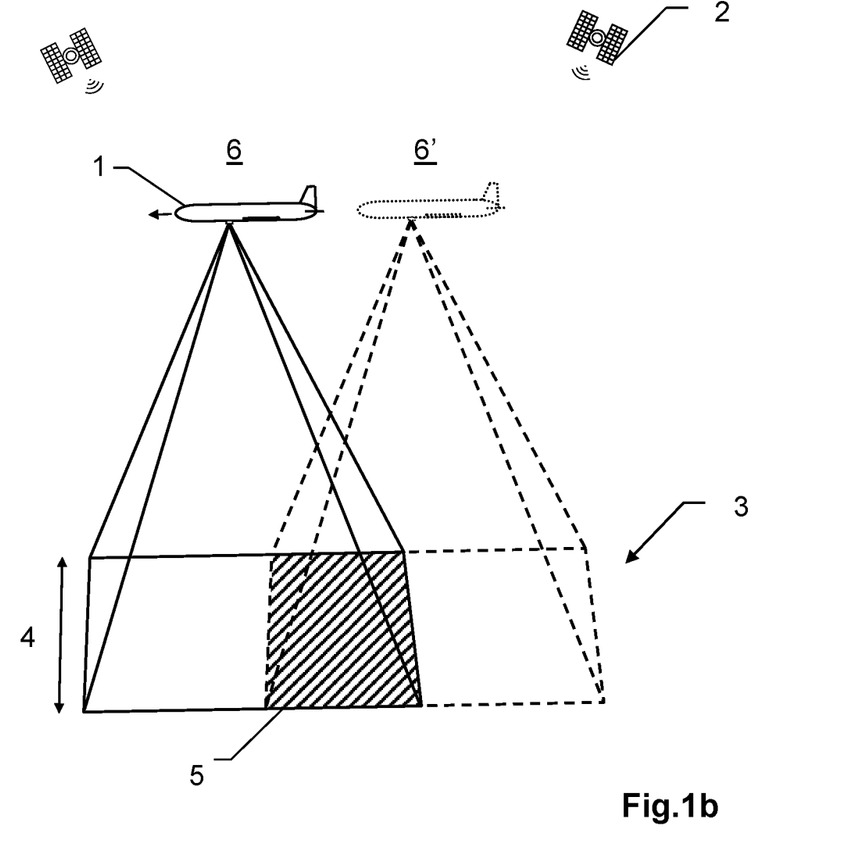

FIGS. 1a and 1b each show an aerial surveying measurement of an overflown terrain using a dedicated camera, carried by an airplane 1 and adapted for generating orthophoto data to be used to create a 3D surface model of the overflown terrain.

By way of example, as shown by FIG. 1a, a line camera based on CCD or CMOS sensor technology is used ("pushbroom" scanning), e.g. adapted for multispectral RGBN imaging or hyperspectral imaging. The camera may further be equipped with polarization analyzers, e.g. to support semantic discrimination of objects with specific wavelength or polarization dependent reflection properties, such as for example typical reflection signals for vegetation and water.

Aerial surveying camera systems typically involve forward motion compensation, e.g. based on TDI technology when using a CCD-based camera or a mechanical solution when using a CMOS-based camera. Furthermore, the system comprises an embedded flight management and GNSS/IMU system 2.

By way of example, cameras for aerial imaging may have a transverse field of view of 45° for providing a large swath 3, wherein sensors with a rather large transverse extension, e.g. at least 60 mm, are used. Transverse extension is defined as the extension along a direction which is foreseen to be the direction across a forward flying direction when the camera is mounted to the airplane, in the following called transverse direction 4.

During measurement, the overflown terrain is consecutively imaged by the camera arrangement, wherein due to the forward flight movement a surface swath 3 is captured. When using a frame camera, as shown by FIG. 1b, the surface swath 3 comprises overlapping areas 5 with surface points imaged from different positions 6,6' and thus suitable for stereoscopic processing and for generating 3D surface information.

Figure 2:
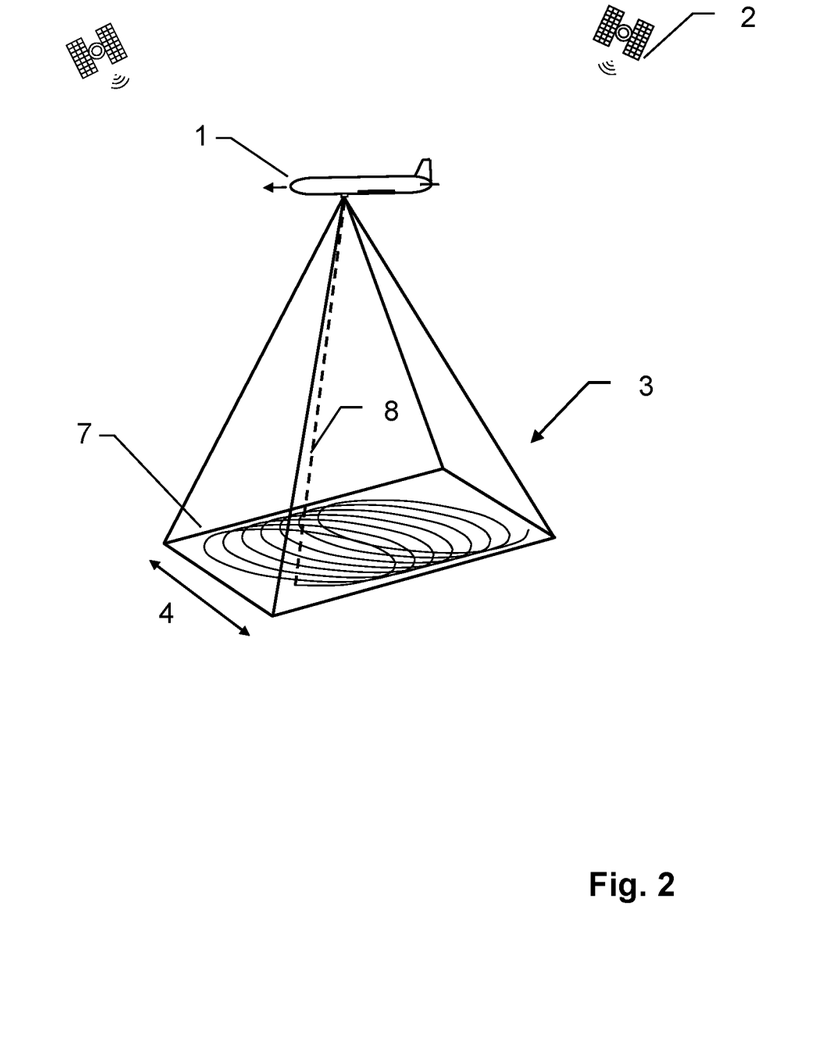
FIG. 2: aerial surveying combining imaging and LiDAR scanning in one go using the inventive hybrid LiDAR-imaging device.

FIG. 2 shows an aerial surveying measurement combining ortho-imaging and LiDAR scanning, e.g. by using the inventive hybrid LiDAR-imaging device, wherein camera data and LiDAR data are acquired in one go, e.g., during the same flyover. Thus, it is ensured that the orthophoto data and the LiDAR data correspond to the same snapshot of the current terrain geometry and the current terrain condition.

For generating orthophoto data a ground viewing aerial line or frame camera is used, e.g. having a photodetector which has a transverse extension which is at least 60 mm and a transverse field of view of 45°.

The LiDAR data are generated based on a circular scan pattern (Palmer scan), wherein due to the forward flight movement of the airplane a spiral scan pattern 7 is drawn on the ground by the LiDAR beam 8, wherein the LiDAR scanning field of view along the transverse direction 4 substantially covers the imaging field of view of the ground viewing camera along the transverse direction. Thanks to the spiral scan pattern 7 a large area can be scanned, wherein each surface point is scanned from different viewing angles and thus shadow effects are greatly minimized.

Alternatively, a different scan pattern may be used, e.g. a rather simple (linear) "zig-zag" scan pattern or a more elaborated scan movement such as a Lissajous scan pattern. In particular, the LiDAR device may be configured to vary at least one of a projected beam pattern on the ground, a beam shape, a scanning rate, a pulse repetition rate, and the radiation power, e.g. based on a forward flying speed and an actual ground distance of the aerial device, e.g. to provide a uniform point spacing within the observed surface band.

Figure 3:
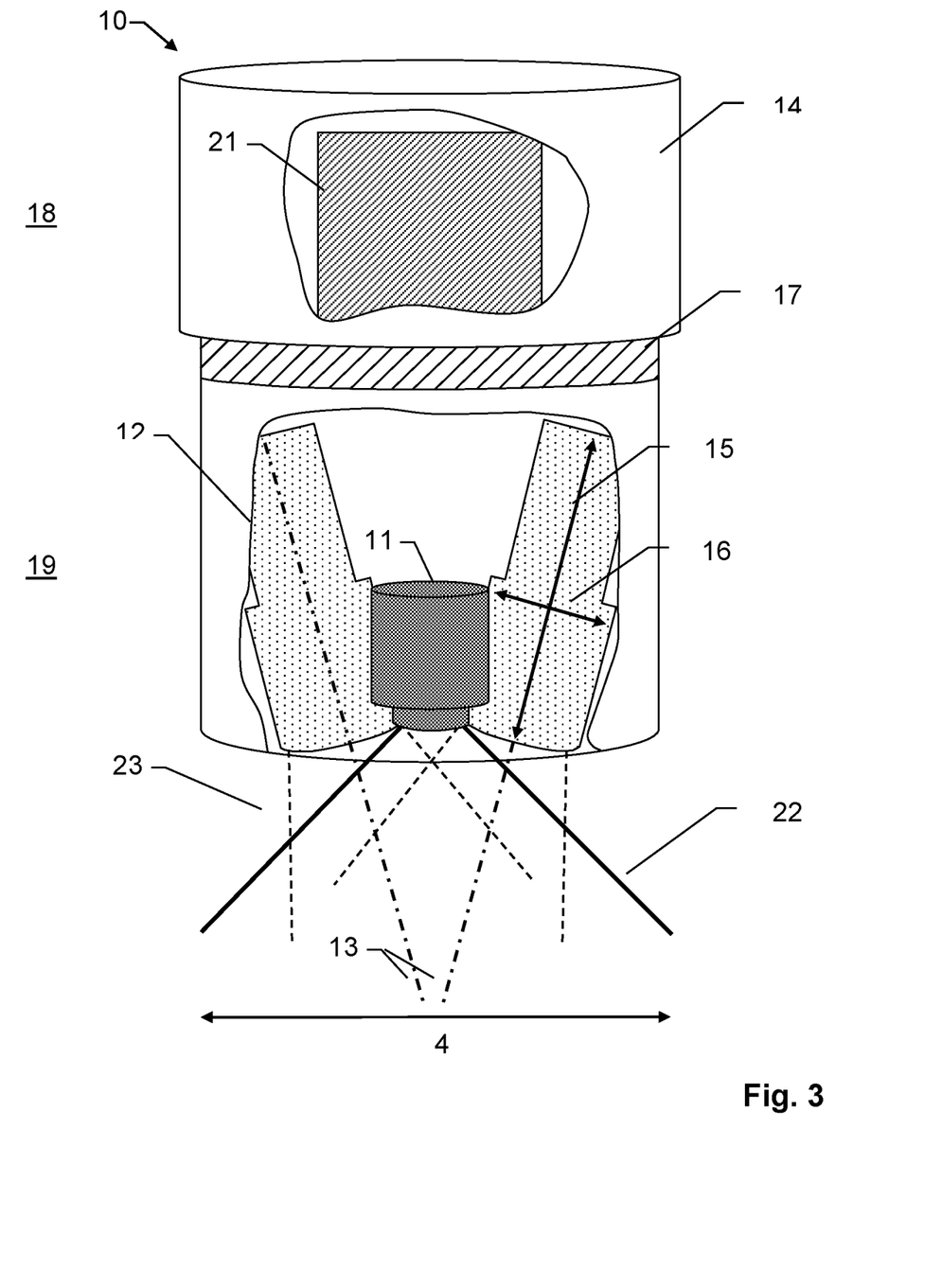
FIG. 3: an embodiment of the inventive hybrid LiDAR-imaging device for aerial surveying.

FIG. 3 shows an embodiment of the inventive hybrid LiDAR-imaging device 10, comprising a ground viewing camera 11 having a photodetector with a transverse extension of at least 60 mm and being adapted for generating orthophoto data, as well as two LiDAR devices 12 configured that their nominal axes 13 are tilted with respect to each other.

The ground viewing camera 11, the two LiDAR devices 12, and at least part of a pose system (not shown) to derive position and orientation of the hybrid LiDAR-imaging device are mounted inside a common housing 14. For example, an IMU for deriving an orientation of the hybrid LiDAR-imaging device may be mounted inside the common housing, wherein the hybrid LiDAR-imaging device is configured to derive its actual position by an externally mounted GNSS/INS system.

The camera 11 may be a line or frame camera based on CCD or CMOS sensor technology, e.g. a multispectral RGBN camera, and being specifically engineered for aerial surveying, e.g. having forward motion compensation to provide high image quality and high geometric accuracy.

Each of the two LiDAR devices 12 has a longitudinal extension 15 being defined as the extension axially along a ground viewing nominal LiDAR axis 13 and a lateral extension 16 being defined as an extension substantially orthogonal to the nominal LiDAR axis 13, wherein the longitudinal extension 15 is larger than the lateral extension 16. Therefore, a compact packaging into the common housing 14 is enabled.

For example, the LiDAR-imaging device 10 may have dedicated coupling means 17 in order to be installed on a specifically foreseen stabilization platform of the airplane, e.g. wherein the hybrid LiDAR-imaging device 10 as a whole is stabilized in terms of stable nadir view, e.g. by compensating for any aircraft movement during exposure. Alternatively, or in addition, the LiDAR-imaging device 10 may have integrated stabilization means (not shown), e.g. based on an integrated IMU for automatic drift control and pitch, roll compensation.

The common housing 14 has an upper part 18 and a lower part 19, the lower part 19 being the part which is closer to the ground when the hybrid LiDAR-imaging 10 device is installed in the aerial device. According to a particular embodiment of the disclosure, the ground viewing camera 11 and the two LiDAR devices 12 are installed in the lower part 19 such that the lower part 19 comprises substantially all the optics of the ground viewing camera 11 and of the two LiDAR devices 12 as well as the sensors of the integrated part of the pose system, particularly an IMU sensor. The upper part 18 comprises substantially all the rest of the hardware, e.g. processing components of a computing unit 21 configured for controlling the ground viewing camera 11 and the two LiDAR devices 12, as well as for data processing and data storage.

The camera 11 and the two LiDAR devices 12 are arranged in a triangular configuration, wherein the two LiDAR devices are arranged next to each, substantially located on a line parallel to the transverse direction 4, and wherein the ground viewing camera 11 is arranged offset from this line, e.g., the camera 11 is preceding or trailing the two LiDAR devices 12 with respect to the forward flying direction.

The two LiDAR devices have a combined scanning field of view along the transverse direction 4 which substantially covers an imaging field of view 22 of the camera 11 along the transverse direction 4, wherein, by way of example, the LiDAR devices 12 are configured that their visual field cones 23 cross each other.

Figure 4:
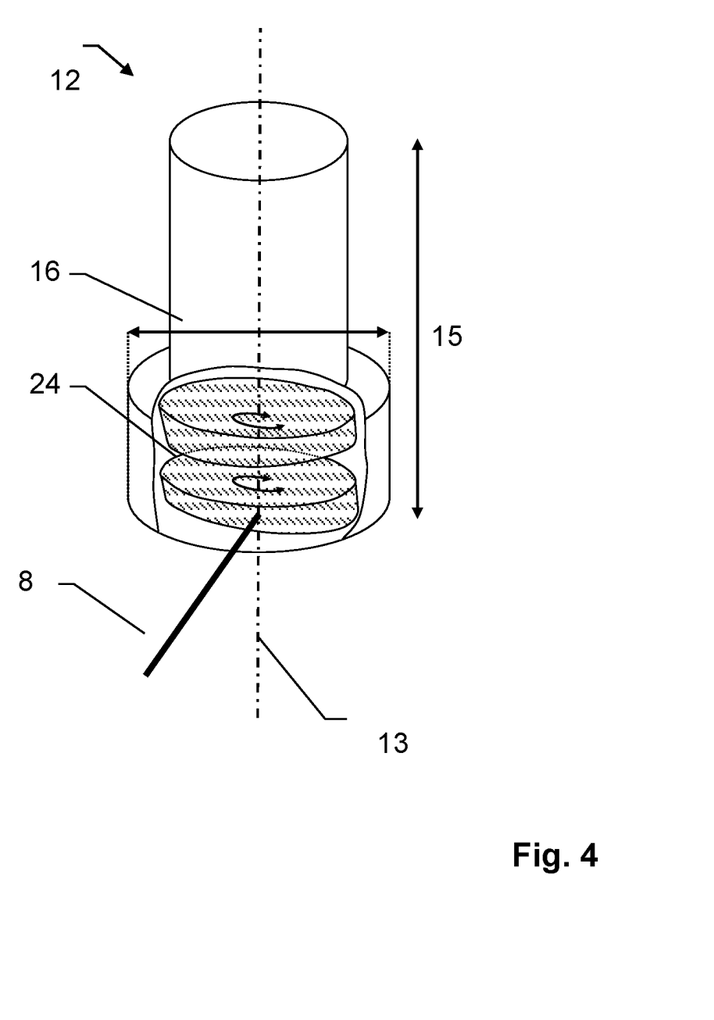
FIG. 4: an embodiment of the inventive compact LiDAR device of the LiDAR arrangement comprising a wedge prism arrangement for beam steering.

FIG. 4 shows an embodiment of a compact lidar device 12 of the LiDAR arrangement comprising a wedge prism arrangement 24, e.g. a Risley prism, to direct the LiDAR beam 8 to the ground according to a defined scan pattern, e.g., wherein at least one wedge prism is rotated around the nominal LiDAR axis 13 for beam steering.

Since the optomechanical dimensions of a lidar scanner may be substantially driven by the deflection unit for beam steering, using rotating prisms in transmission, e.g. instead of using oscillating or rotating mirrors, allows that the LiDAR device 12 is built substantially vertically, e.g. without optical folding, and thus provides a compact optomechanical setup and packaging with respect to the horizontal plane, e.g., providing a close together arrangement of the exit optics of the LiDAR device 12 and of the ground viewing camera 11 (see FIG. 3).

For example, the LiDAR device 12 may be configured that the ratio of its lateral extension 16 divided by its longitudinal extension 15 is less than 0.5.

Figure 5A:
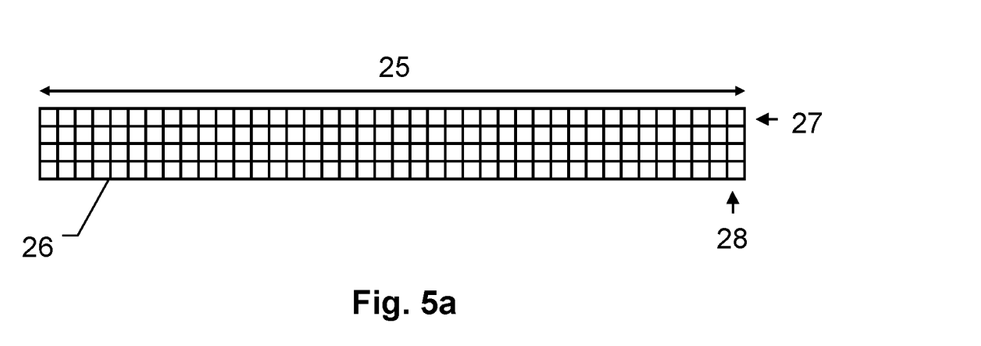
FIG. 5a,b: schematic illustration of the overall exposure area of the camera arrangement, wherein the transverse extension is provided by a single line camera (a) or multiple individual line cameras (b)
Figure 5B:
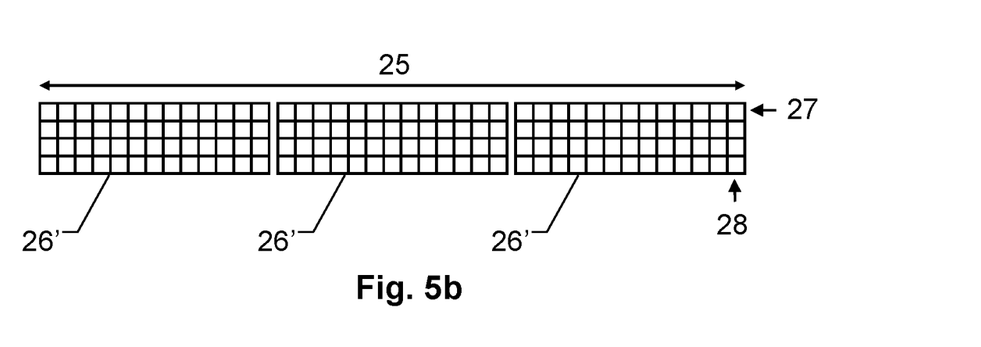

FIGS. 5a,b show a schematic illustration of the overall exposure area of the camera arrangement 11 (FIG. 3), wherein FIG. 5a shows an embodiment wherein the transverse extension 25 of the overall exposure area is provided by a single line sensor 26, and FIG. 5b shows an embodiment wherein the transverse extension 25 is provided by three individual line sensors 26', e.g. of a single line camera or three individual line cameras next to each other.

Line cameras are particular types of cameras which may only have one or a few radiation-sensitive pixel rows 27 but a multitude of pixel columns 28, in contrast to frame cameras which have both a multitude of pixel rows and a multitude of pixel columns. For example, as shown in FIGS. 5a and 5b, the line camera may have four light sensitive pixel rows 27 forming an effective sensor line 26, each pixel row 27 being sensitive to a different wavelength, e.g. providing an RGBN wavelength coverage for that effective sensor line 26, whereas the line camera has thousands of pixel columns 28.

An effective sensor line corresponds to a projected "pushbroom" scan line on the ground and may comprise pixel rows having different spectral sensitivity and/or pixel rows configured for providing forward motion compensation, e.g. different TDI stages.

However, the overall number of pixel rows forming an effective sensor line, e.g. less than 200, is much smaller than the overall number of pixel columns, e.g. more than 10,000, as for example in the Leica ADS100 line camera with multi-spectral capability.

For obtaining a 2D-image a line camera is configured as push broom scanner, wherein the effective sensor lines are arranged perpendicular to the flight direction of an aerial device 1 (FIG. 1a) such that different areas of the ground surface are imaged as the aerial device 1 flies forward.

Line sensors may have similar pixel sizes as sensors used in frame cameras. Thus, since the line length of a line camera (e.g. 17 k pixel) is much longer than the frame width of a frame camera (e.g. 1-4 k pixel), for a given objective field a line camera provides a better spatial resolution. Moreover, a sensor line can be read out much faster than a frame.

Figures 6A, 6B:
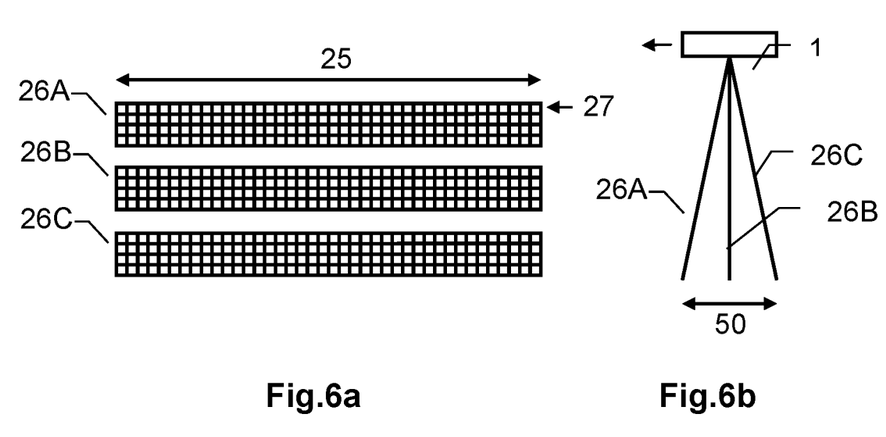

FIGS. 6a,b show a schematic illustration of a further embodiment of a line camera arrangement, comprising three effective sensor lines separated along the flying direction. By way of example, each effective sensor line has a transverse extension 25 of at least 60 mm comprising 10,000 pixel columns.

FIG. 6a shows a top view of the line camera arrangement and FIG. 6b shows a side view of the line camera arrangement parallel to the flying direction.

By way of example, the line camera arrangement comprises a forward viewing effective sensor line 26A, a nadir viewing effective sensor line 26B, and a backward viewing effective sensor line 26C.

Thus, such an arrangement has the benefit of high spatial resolution and fast read out provided by a line camera as well as providing an overlapping area 50 wherein surface points are imaged from different positions 6,6' (FIG. 1b) under different viewing angles corresponding to the different effective sensor lines 26A-C. Therefore, the imaging data is suitable for stereoscopic processing and a reduction of blind spots and improved imaging of vertical surfaces is provided.

Although the disclosure is illustrated above, partly with reference to some example embodiments, it must be understood that numerous modifications and combinations of different features of the embodiments can be made. These and other modifications lie within the scope of the appended claims. Additionally, in the present disclosure, the term "substantially" should be interpreted to be at least ninety percent of an actual value (e.g., all pixels).

The invention claimed is:

1. A hybrid LiDAR-imaging device configured for aerial surveying of an overflown terrain by an airplane, wherein the hybrid LiDAR-imaging device comprises a camera arrangement configured for providing forward motion compensation and for acquiring camera data adapted for generating orthophoto data, wherein:
   an overall exposure area is provided by the camera arrangement,
   the overall exposure area has a transverse extension defined as the extension along a direction which is foreseen to be the direction across a forward flying direction when the hybrid LiDAR-imaging device is installed to the airplane, in the following called transverse direction, and the transverse extension is at least 60 mm,
   the hybrid LiDAR-imaging device comprises a LiDAR arrangement configured for generating LiDAR data by providing a scanning movement of a LiDAR measurement beam relative to the LiDAR arrangement, thereby generating a scanning pattern of individual LiDAR measurement beams, wherein each LiDAR measurement beam provides for a point measurement on the basis of distance and angle associated with the LiDAR measurement beam, the LiDAR arrangement comprising at least a first LiDAR device,
   the first LiDAR device has a first longitudinal extension extending axially along a ground viewing nominal first LiDAR axis and a first lateral extension extending substantially orthogonal to the nominal first LiDAR axis, wherein the first longitudinal extension is larger than the first lateral extension,
   the LiDAR arrangement is configured to have a LiDAR scanning field of view for moving the LiDAR measurement beam along the transverse direction which substantially covers an imaging field of view of the camera arrangement along the transverse direction,
   the camera arrangement and the LiDAR arrangement are mounted into a common housing, the common housing configured to be installed to the airplane, and
   the hybrid LiDAR-imaging device is configured:
      to generate the camera data and the LiDAR data in a same measurement period, and
      to generate, based on positioning information of a positioning system, positional reference information for the camera data as well as the LiDAR data.

2. The hybrid LiDAR-imaging device according to claim 1, wherein:
   the camera arrangement comprises a line camera arrangement having at least two effective sensor lines arranged with mutually different viewing directions with respect to a pitch axis, and
   up to five effective sensor lines are arranged with mutually different viewing directions with respect to the pitch axis.

3. The hybrid LiDAR-imaging device according to claim 1, wherein the first LiDAR device comprises a wedge prism arrangement configured to direct the LiDAR beam to the ground according to the scanning pattern, based on a rotation of at least one wedge prism of the wedge prism arrangement around the first nominal LiDAR axis, wherein the first wedge prism is part of a Risley prism.

4. The hybrid LiDAR-imaging device according to claim 1, wherein the first LiDAR device is configured such that the ratio of the first lateral extension divided by the first longitudinal extension is less than 0.5.

5. The hybrid LiDAR-imaging device according to claim 1, wherein:
   the LiDAR arrangement comprises a second LiDAR device,
   the second LiDAR device has a second longitudinal extension extending axially along a ground viewing nominal second LiDAR axis and a second lateral extension extending substantially orthogonal to the nominal second LiDAR axis, wherein the second longitudinal extension is larger than the second lateral extension, and
   the LiDAR arrangement is configured such that the first and the second LiDAR device are arranged relative to each other such that the first and the second nominal LiDAR axis are tilted with respect to each other.

6. The hybrid LiDAR-imaging device according to claim 5, wherein:
   the first LiDAR device has a first visual field cone and the second LiDAR device has a second visual field cone, and
   the first and the second LiDAR devices are configured such that the first and second visual field cones cross each other.

7. The hybrid LiDAR-imaging device according to claim 1, wherein the camera arrangement comprises at least one individual camera with a photodetector which has a transverse extension which is at least 60 mm.

8. The hybrid LiDAR-imaging device according to claim 1, wherein the camera arrangement comprises at least two individual cameras, wherein each camera is used to provide a different part of the transverse extension of the overall exposure area.

9. The hybrid LiDAR-imaging device according to claim 1, wherein:
the hybrid LiDAR-imaging device is configured such that the camera arrangement has a field of view of at least 20 degrees along the transverse direction, and
the transverse extension of the overall exposure area comprises an arrangement of a plurality of photopixels representing a sensor line substantially along the transverse direction which comprises at least 10,000 photopixels.

10. The hybrid LiDAR-imaging device according to claim 1, wherein the camera arrangement is configured for generating multispectral data and/or for generating hyperspectral imaging data.

11. The hybrid LiDAR-imaging device according to claim 1, wherein:
the hybrid LiDAR-imaging device comprises a computing unit configured for controlling the camera arrangement, the LiDAR arrangement, and data processing and/or data storage,
the hybrid LiDAR-imaging device comprises an inertial measuring unit (IMU),
the common housing has an upper part and a lower part, the lower part being the part which is closer to the ground when the hybrid LiDAR-imaging device is installed in the airplane,
the camera arrangement, the LiDAR arrangement, and the IMU are installed in the lower part such that the lower part comprises substantially all optics of the camera arrangement, the LiDAR arrangement, and the IMU sensors, and
the upper part comprises substantially all processing hardware of the computing unit.

12. The hybrid LiDAR-imaging device according to claim 11, wherein:
the camera arrangement comprises exactly one individual camera with a photodetector which has a transverse extension which is at least 60 mm,
the LiDAR arrangement comprises exactly two LiDAR devices including the first and second LiDAR devices, wherein the first and the second LiDAR devices are arranged relative to each other such that the first and the second nominal LiDAR axes are tilted with respect to each other,
the first LiDAR device and the second LiDAR device are arranged next to each other and substantially located on a first line parallel to the transverse direction, and
the exactly one individual camera is arranged on a second line substantially orthogonal to the first line, such that the exactly one camera, the first LiDAR device, and the second LiDAR device are arranged in a triangular configuration.

13. The hybrid LiDAR-imaging device according to claim 1, wherein the generated camera data and LiDAR data are configured for 3D modeling for increased efficiency and accuracy of object extraction.

14. The hybrid LiDAR-imaging device according to claim 1, wherein the generated camera data and LiDAR data are suitable for stereoscopic processing.

15. The hybrid LiDAR-imaging device according to claim 1, wherein the generated camera data and LiDAR data are suitable for stereoscopic processing and reduction of blind spots.

16. The hybrid LiDAR-imaging device according to claim 1, wherein the generated camera data and LiDAR data are suitable for stereoscopic processing and reduction of blind spots with improved imaging of vertical surfaces.

* * * * *